United States Patent [19]

Yamahira et al.

[11] Patent Number: 5,273,842
[45] Date of Patent: Dec. 28, 1993

[54] NON-AQUEOUS ELECTROLYTE SECONDARY BATTERY

[75] Inventors: Takayuki Yamahira; Toru Nagaura, both of Fukushima, Japan

[73] Assignee: Sony Corporation, Tokyo, Japan

[21] Appl. No.: 920,925

[22] Filed: Jul. 28, 1992

[30] Foreign Application Priority Data

Jul. 31, 1991 [JP] Japan .................. 3-214587

[51] Int. Cl.$^5$ ................. H01M 10/40; H01M 4/96
[52] U.S. Cl. ........................ 429/94; 429/194; 429/218
[58] Field of Search ............... 429/194, 218, 196, 197; 252/502; 423/445

[56] References Cited

U.S. PATENT DOCUMENTS

| | | | |
|---|---|---|---|
| 4,980,250 | 12/1990 | Takahashi et al. | 429/194 |
| 5,028,500 | 7/1991 | Fong | 429/194 |
| 5,053,297 | 10/1991 | Yamahira et al. | 429/218 X |
| 5,093,216 | 3/1992 | Azuma et al. | 429/218 |

*Primary Examiner*—Anthony Skapars
*Attorney, Agent, or Firm*—Hill, Steadman & Simpson

[57] ABSTRACT

There is disclosed a non-aqueous electrolyte secondary battery in which carbonaceous material is used as the anode active material and charge/discharge is carried out by doping/undoping of lithium. The carbonaceous material has a grading distribution such that the 10% cumulative or accumulated diameter is 6 to 20 μm, the 50% cumulative diameter is 20 to 55 μm, and the 90% cumulative diameter is 55 to 90 μm. When a carbonaceous material such that the grading distribution satisfies the above condition is used as the anode active material, the self-discharge rate is suppressed and occurrence of an internal short-circuit is also prevented.

4 Claims, 2 Drawing Sheets

NON-AQUEOUS ELECTROLYTE SECONDARY BATTERY

BACKGROUND OF THE INVENTION

This invention relates to a non-aqueous electrolyte secondary battery, and more particularly to a non-aqueous electrolyte secondary battery using carbonaceous material as the anode active material.

In recent years, with popularization of portable equipment such as a video camera or a radio cassette, etc., there has been an increased demand for a secondary battery which can be repeatedly used in place of a primary battery which is disposable.

Most of secondary batteries currently in use are a nickel-cadmium battery using an alkali electrolytic solution. However, since this nickel-cadmium battery has a low voltage of about 1.2 volts, it is difficult to improve the energy density. A further drawback is that sufficient life time cannot be obtained because the self-discharge rate is a higher value of more than 20% in a month at an ordinary temperature.

In view of this, there has been proposed a non-aqueous electrolyte secondary battery in which a non-aqueous solvent is used as an electrolytic solution and light metal such as lithium, etc. is used as the anode. Such non-aqueous electrolyte secondary battery advantageously has a high voltage of more than 3 volts, high energy density, and a low self-discharge rate. However, metal lithium, etc. used as the anode is gradually crystal-grown in the form of dendrite by repetition of a charge/discharge cycle, and comes into contact with the cathode. As a result, a short-circuit takes place in the battery. For this reason, such a non-aqueous electrolyte secondary battery has a short life time, so it is also difficult to put such a battery into practice.

In order to solve the problem of such an internal short-circuit, it is being studied to alloy lithium, etc. with other metal to use this alloy as the anode. In this case, however, since alloy is caused to be fine particles with repetition of the charge/discharge cycle, a sufficient life time cannot be obtained, resulting in difficulty in putting it into practice.

In view of this, there has been proposed a non-aqueous secondary battery as disclosed in the Japanese Patent Laid Open Application No. 90863/1987 publication in which carbonaceous material such as coke, etc. is used as the anode active material to carry out the charge/discharge cycle by doping/undoping of lithium. Such a secondary battery does not have the problems described above, and has an excellent cycle life time characteristic.

Further, when, e.g., $Li_xMO_2$ (M represents a single or more kinds of transition metals, and $0.05<x<1.10$) as proposed by the applicant of this application is used as the cathode active material, the battery life time is further improved so that a non-aqueous electrolyte secondary battery having a desired high energy density can be provided. For this reason, great expectations are laid on this non-aqueous electrolyte secondary battery.

However, non-aqueous electrolyte secondary batteries using the carbonaceous material as the anode active material disadvantageously have a much higher self-discharge rate than that of batteries using metal lithium, etc. as the anode active material.

In order to improve such a drawback, e.g., in the Japanese Patent Laid Open Application No. 121248/1988 publication, it is disclosed that a carbonaceous material having grading distribution of more than 90% in terms of volume in the range from 0.1 to 50 μm is used. However, even if carbonaceous material as described above is used, it is found that the self-discharge characteristic is not necessarily improved. Further improvement is necessary in order to obtain a non-aqueous electrolyte secondary battery having higher utility.

OBJECT AND SUMMARY OF THE INVENTION

An object of this invention is to provide a non-aqueous electrolyte secondary battery having excellent energy density and cycle characteristics, and having a low self-discharge rate.

In accordance with the principles of the present invention, it has been found that the characteristics of a battery such as the self-discharge rate, etc. is improved by using a carbonaceous material having a reasonable grading distribution.

A non-aqueous electrolyte secondary battery constructed in accordance with the principles of the present invention includes carbonaceous material used as the anode active material. The carbonaceous material has a grading distribution such that the 10% cumulative or accumulated diameter is 6 to 20 μm, the 50% cumulative diameter is 20 to 55 μm, and the 90% cumulative diameter is 55 to 90 μm.

When carbonaceous material having a small particle diameter is used as the anode material of the non-aqueous electrolyte secondary battery, the self-discharge rate increases because the carbonaceous material having a small particle diameter has a large specific surface area and a high activity. On the other hand, when carbonaceous material having a large particle diameter is used, an internal short-circuit is likely to occur as a result of the fact that large particle diameter carbonaceous material is penetrated through the separator, so packing or filling density is lowered and the discharge capacity, etc. is also deteriorated.

In such a non-aqueous electrolyte secondary battery, when carbonaceous material having a grading distribution that satisfies a predetermined condition is used as the anode material, mixing of fine particles or large diameter particles is held down to low level. As a result, an increase in the self-discharge rate and/or occurrence of internal short-circuit are prevented. Further, the packing density becomes high. This is advantageous to the discharge capacity, etc.

Accordingly, in accordance with the principles of the present invention, it is possible to provide a non-aqueous electrolyte secondary battery having a low self-discharge rate, a low occurrence rate of the internal short-circuit, and a high packing density of the carbonaceous material.

Further, a non-aqueous electrolyte secondary battery constructed in accordance with the principles of the present invention has an excellent energy density, cycle characteristic, and self-discharge rate. Thus, a non-aqueous electrolyte secondary battery constructed in accordance with the principles of the present invention has high utility.

DETAILED DESCRIPTION OF THE INVENTION

Figure 1:
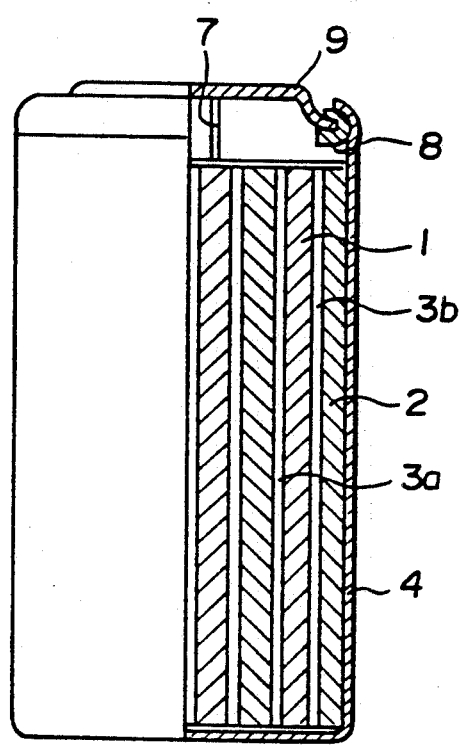
FIG. 1 is a schematic longitudinal cross sectional view showing an example of a non-aqueous electrolyte secondary battery to which principles of the present invention is applied.

In accordance with the principles of the present invention, carbonaceous material is used as the anode active material. Here, in order to improve the self-discharge rate, and to attain a satisfactory cycle characteristic, there is used a carbonaceous material such that the 10% cumulative or accumulated diameter is 6 to 20 μm, the 50% cumulative diameter is 20 to 55 μm, and the 90% cumulative diameter 55 to 90 μm.

Namely, in a non-aqueous electrolyte secondary battery using carbonaceous material, its self-discharge is allowed to take place by the use of carbonaceous material having fine particle diameter, particularly carbonaceous material having a particle diameter less than 5 to 10 μm. Accordingly, it is preferable for preventing the self-discharge not to use such carbonaceous material having a small particle diameter. On the other hand, where the particle diameter of the carbonaceous material is too large, an internal short-circuit is likely to occur as a result of the fact that large particle diameter carbon is penetrated through the separator. Further, the packing density is also lowered, so any inconvenience may take place with respect to the discharge capacity, etc. In view of this, the present invention uses a carbonaceous material having the above-mentioned grading distribution to suppress degradation of the battery characteristic due to mixing of fine particles and/or large diameter particles. It is noted that a carbonaceous material where the 10% cumulative or accumulated particle diameter is less than 10% in the above-mentioned grading distribution is preferable.

It is to be noted that in accordance with the principles of the present invention, the 10% cumulative or accumulated particle diameter, the 50% cumulative particle diameter and the 90% cumulative particle diameter are particle diameters when the volume integrated from 0 μm becomes equal to 10%, 50% and 90%, respectively, in the grading distribution diagram. For example, "a grading analyzer sold under the trademark Microtrack" can be used to measure the number n of particles and the diameter d of each particle, thus making it possible to easily calculate respective cumulative or accumulated particle diameters.

As the carbonaceous material, there may be used material which can dope or undope lithium, e.g., pyrolytic carbon, coke (pitch coke, needle coke, petroleum coke, etc.), graphite, carbon in the form of glass, baked body of organic high molecular compound (material obtained by baking phenol resin or furan resin, etc. at a suitable temperature), carbon fiber, and active carbon, etc.

On the other hand, as the cathode, there may be used a transition metal oxide such as mangan dioxide or vanadium pentoxide, a transition metal chalcogen compound such as iron sulfide or titanium sulfide, and a composite compound of any one of the above materials and lithium. For example, lithium-cobalt composite oxide and lithium-cobalt-nickel composite oxide are preferable as the cathode material since both have a high voltage/high energy density and excellent cycle characteristics.

Any electrolytic solution in which an electrolyte is dissolved in a conventional organic solvent may be used. Accordingly, as the organic solvent, there are enumerated ester such as propylene carbonate, ethylene carbonate, γ-butyrolactone, etc.; ether such as diethyl ethel, tetrahydrofuran, substitutional tetrahydrofuran, dioxysolan, pyrane and its derivative, dimethoxyethane, diethoxyethane, etc.; 3 substitution-2-oxazolizinone such as 3-methyl-2-oxazolizinone, etc.; sulforan, methyl sulforan, acetonitrile, propyonitrile, etc. In practice, an electrolytic solution including one of the above materials or two or more kinds thereof mixed together may be used. Further, as the electrolyte, lithium perchlorate, lithium borofluoride, lithium phosphofluoride, aluminate chloride lithium, lithium halide, trifuruoromethane sulfonic lithium, etc may be used.

An embodiment to which this invention is applied will now be described with reference to the attached drawings.

First, a non-aqueous electrolyte secondary battery shown in FIG. 1 was prepared as follows.

A cathode plate 1 was prepared as follows.

A cathode compound ($LiCoO_2$) was obtained by mixing lithium carbonate of 1 mol and cobalt carbonate of 1 mol, burning a mixture thereof for 5 hours in air at 900° C. and crushing the baked body thus obtained by means of a ball mill. Then, $LiCoO_2$ of 91 parts by weight, was mixed with graphite of 6 parts by weight serving as a conductive agent, and polyvinylidene fluoride of 3 parts by weight, serving as a binder, and N-methylpyrolidone was added as a dispersion agent to the above mixture to allow the article thus obtained to be in the form of paste. Then, this cathode paste was uniformly coated on both surfaces of a collector made of an aluminum foil having a thickness of 30 μm. The article thus obtained was dried. Thereafter, a roller press was applied to the article to form a cathode plate 1. It is to be noted that this cathode plate 1 was formed as a body in a plate form such that the width was 35 mm, the length was 300 mm, and the thickness was 0.18 mm. In addition, a lead wire 7 of aluminum was affixed to the end portion of the cathode plate 1 by welding.

Then, an anode plate 2 was made up as follows.

An anode active material was obtained by crushing pitch coke for 15 minutes by a ball of stainless steel having a diameter of 12.7 mm within a vibration mill.

Figure 3:
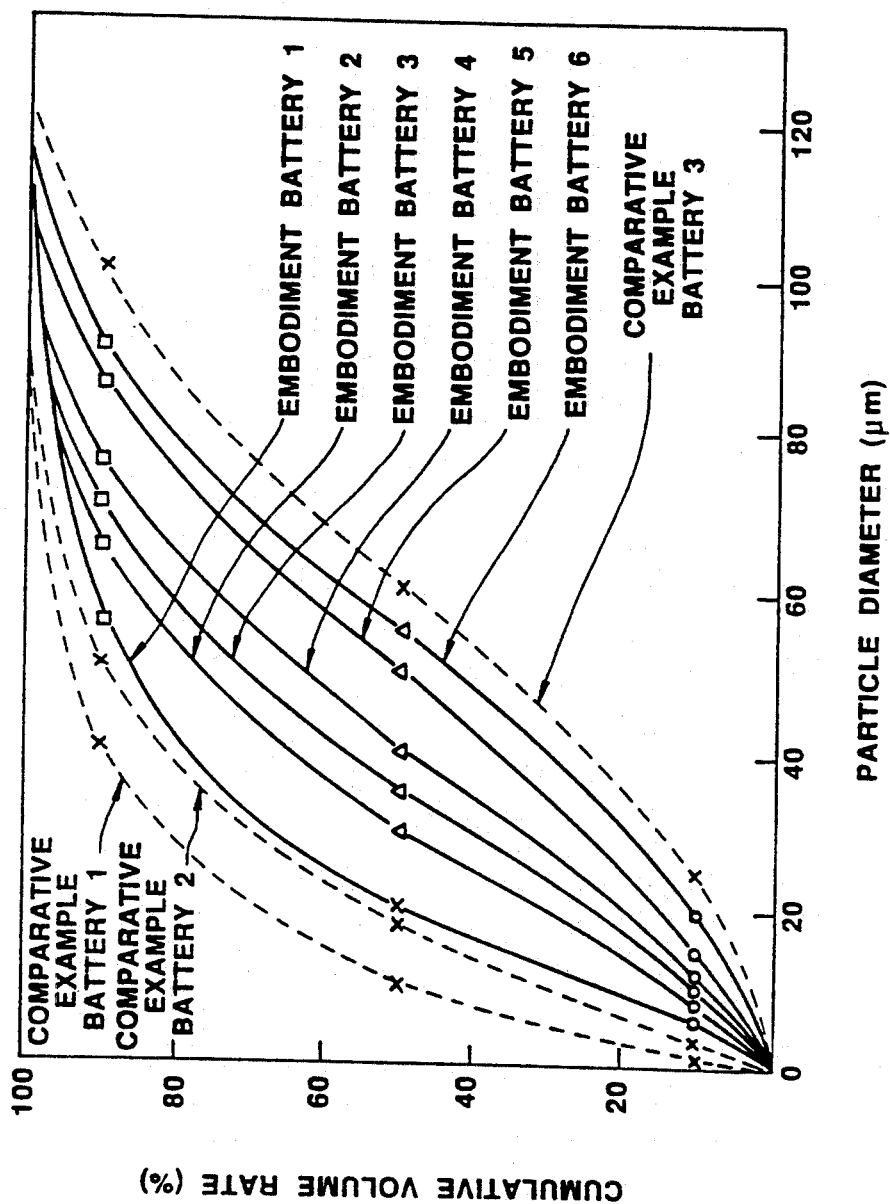
FIG. 3 is a characteristic diagram showing grading distributions of the anode materials.

The grading distribution of pitch coke in the form of particles serving as the anode active material is shown in FIG. 3 and in Table 1. Further, the true density of pitch coke in the form of particles was 2.03 g/cm³, the spacing of the (002) plane determined in conformity with the Japan Society for the Promotion of Science by the X-ray analysis was 3.64 Å, and the crystal thickness Lc in a C-axis direction was 40 Å.

Figure 2:
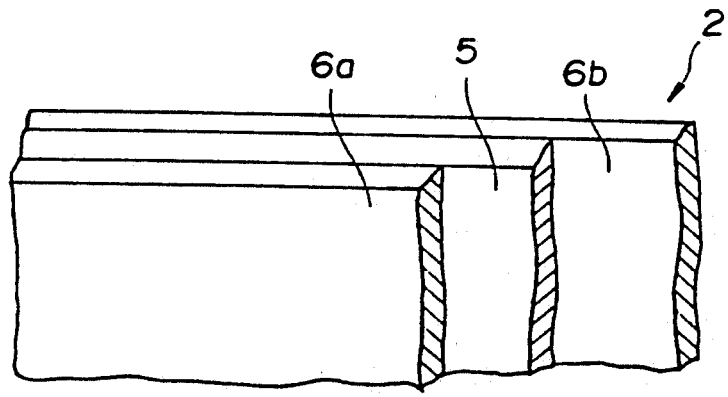
FIG. 2 is a perspective view showing the configuration of the anode plate of the non-aqueous electrolyte secondary battery illustrated in FIG. 1.

Then, the pitch coke in the form of particles of 90 parts by weight was mixed with polyvinylidene fluoride of 10 parts by weight serving as a binder. Then, N-methylpyrolidone was added as a disperse agent to the above mixture. The article thus obtained was caused to be in a paste form. Then, as shown in FIG. 2, this anode paste was uniformly coated on both surfaces of a collector 5 made of copper foil having a thickness of 10 μm, so that active material layers 6a and 6b were formed. After the article thus obtained was dried, a roller press applied thereto to form an anode plate 2. It is to be noted that the anode plate 2 was formed as a body in a plate form such that the width was 35 mm, the length was 300 mm, and the thickness was 0.2 mm. In addition, a lead wire (not shown) of nickel was affixed to the end portion of the anode plate 2 by welding.

The cathode plate 1 and the anode plate 2 were stacked through a pair of thin plate separators 3a and 3b made of polypropylene in order of the anode plate 2, the separator 3a, the cathode plate 1 and the separator 3b, and these parts or components were wound in a spiral form. Then, this wound body was accommodated into a battery can 4 of steel to which nickel plating is implemented to weld the above-described lead wires to the battery can 4 and a battery cap 9.

An electrolytic solution was obtained by dissolving phosphorus hexafluoride lithium in a mixture of propylene carbonate and dimethyl carbonate at a rate of 1 mol/l. The electrolytic solution was poured into the battery can 4 to insert a gasket 8 of polypropylene and the battery cap 9 into the upper part of the battery can 4 to caulk the upper part of the battery can 4 and seal it. Thus, a cylindrical non-aqueous electrolyte secondary battery (embodiment battery 1) having an outside diameter of 13.8 mm and a height of 45 mm as shown in FIG. 1 was formed.

Further, various pitch cokes having different grading distributions were prepared. As shown in the Table 1, the diameter of the steel ball and/or the crushing time of the vibrating mill were changed in making up pitch cokes in the form of particles serving as the anode active material. These pitch cokes were used to make up non-aqueous electrolyte secondary batteries (embodiment battery 2~embodiment battery 6 and, comparative example battery 1~comparative battery 3) in the same manner as in the case of the embodiment battery 1. In FIG. 3 and Table 1, the grading distributions of pitch cokes used in the embodiment battery 2~embodiment battery 6 and the comparative battery 1~comparative battery 3 are shown together. In Table 1, the grading distributions were shown in volume rate (%).

A constant current charging was carried out until a final voltage 4 volts at a charge current of 100 mA was achieved in connection with the above-described embodiment battery 1~embodiment battery 6 and comparative battery 1~comparative battery 3. Then, a charge/discharge cycle, to carry out a constant current discharge until a final voltage 2.5 volts at a discharge current of 100 mA was achieved, was repeatedly carried out 20 times. Thus, a discharge capacity at the time of the twentieth discharge (hereinafter referred to as a "capacity before preservation or storage") was measured.

Then, after charging was carried out on the above-described charge condition for a second time, respective batteries were left for 30 days (720 hours) at 24° C. After such batteries were left, only one discharge was carried out on the above-described discharge condition to measure discharge capacities (hereinafter referred to as a "capacity after preservation or storage") to compare them with the capacities before preservation or storage to thereby calculate self-discharge rates. The results are shown in Table 2.

TABLE 2

|  | CAPACITY BEFORE PRESERVATION (mAH) | CAPACITY AFTER PRESERVATION (mAH) | SELF-DISCHARGE RATE (%) |
|---|---|---|---|
| EMBODIMENT BATTERY 1 | 403 | 367 | 8.9 |
| EMBODIMENT BATTERY 2 | 403 | 370 | 8.2 |
| EMBODIMENT BATTERY 3 | 405 | 375 | 7.5 |
| EMBODIMENT BATTERY 4 | 407 | 378 | 7.1 |
| EMBODIMENT BATTERY 5 | 409 | 381 | 6.8 |
| EMBODIMENT BATTERY 6 | 407 | 379 | 6.9 |
| COMP. EX. BATTERY 1 | 395 | 323 | 18.2 |
| COMP. EX. BATTERY 2 | 400 | 340 | 15.0 |
| COMP. EX. BATTERY 3 | 380 | 353 | 7.0 |

From FIG. 3 and Tables 1 and 2, it is seen that, in the case of the embodiment battery 1~embodiment battery 6 using pitch coke having a grading distribution such

TABLE 1

|  | STEEL BALL DIAMETER (mm) | POWDERING TIME (MIN.) | GRADING DISTRIBUTION (μm) | | |
|---|---|---|---|---|---|
|  |  |  | 10% CUMULATIVE DIAMETER | 50% CUMULATIVE DIAMETER | 90% CUMULATIVE DIAMETER |
| EMBODIMENT BATTERY 1 | 12.7 | 15 | 6 | 20 | 55 |
| EMBODIMENT BATTERY 2 | 12.7 | 10 | 8 | 30 | 65 |
| EMBODIENT BATTERY 3 | 12.7 | 7 | 10 | 35 | 70 |
| EMBODIMENT BATTERY 4 | 12.7 | 5 | 12 | 40 | 75 |
| EMBODIMENT BATTERY 5 | 12.7 | 3 | 15 | 50 | 85 |
| EMBODIMENT BATTERY 6 | 12.7 | 2 | 20 | 55 | 90 |
| COMP. EX. BATTERY 1 | 7.6 | 10 | 1 | 10 | 40 |
| COMP. EX. BATTERY 2 | 12.7 | 10 | 3 | 18 | 50 |
| COMP. EX. BATTERY 3 | 12.7 | 1 | 25 | 60 | 100 | that the 10% cumulative or accumulated particle diameter is 6 to 20 μm, the 50% cumulative particle diameter is 20 to 55 μm, and the 90% cumulative particle diameter is 55 to 99 μm, satisfactory results such that the self-discharge rates are less than 10% are obtained. Further, particularly in the embodiment battery 4~embodiment battery 6 in which pitch coke having the 10% cumulative particle diameter of more than 10 μm is used, more satisfactory results, such that the self-discharge rates are less than 7.3% are obtained.

On the contrary, in the comparative example battery 1 and the comparative example battery 2 in which pitch coke having 10% cumulative or accumulated particle diameter less than 3 μm is used, the self-discharge rates are extremely becomes large. Namely, it is seen from the above fact that relatively fine grading pitch coke in which the 10% cumulative or accumulated particle diameter is less than 3 μm negatively influences the self-discharge rates.

On the other hand, in the comparative example battery 3 where the 90% cumulative or accumulated particle diameter is large, its self-discharge rate takes an unquestionable value, but the packing density of the coke cannot be sufficiently obtained. Accordingly, it has become clear that, in order to provide a non-aqueous electrolyte secondary battery having both a small self-discharge rate, excellent discharge capacity and excellent cycle character, it is necessary to use carbonaceous material which does not include such carbonaceous materials having small and large particle diameters, i.e., carbonaceous material having a grading distribution such that the 10% cumulative or accumulated particle diameter is 6 to 20 μm, the 50% cumulative particle diameter is 20 to 55 μm, and the 90% cumulative particle diameter is 55 to 90 μm.

It is to be noted that while one kind of carbonaceous material was used in this embodiment, it is a matter of course to use other carbonaceous materials as the anode active material. Further, as the cathode active material, $Li_xMO_2$ (M is one or more kinds of transition metals) as described above may be used.

Furthermore, the battery may take a square, coin or button form in addition to the cylindrical form of the above-described embodiment. In addition, the non-aqueous electrolyte may be a solid electrolyte. In this case, any solid electrolyte conventionally known may be used.

What is claimed is:

1. A non-aqueous electrolyte secondary battery comprising:
    an anode active material formed of a carbonaceous material,
    said carbonaceous material having a grading distribution where the 10% cumulative or accumulated diameter ranges from 6 to 20 μm, the 50% cumulative diameter ranges from 20 to 55 μm, and the 90% cumulative diameter ranges from 55 to 90 μm.

2. A non-aqueous electrolyte secondary battery as claimed in claim 1, further comprising a cathode active material formed of at least one of lithium/cobalt composite oxide and lithium/cobalt/nickel composite oxide.

3. A non-aqueous electrolyte secondary battery as claimed in claim 1, wherein the anode active material consists of at least one of pyrolytic carbon, coke, graphite, glassy carbon, baked body of organic high molecular compound, carbon fiber, and active carbon.

4. A non-aqueous electrolyte secondary battery as claimed in claim 1, further comprising a cylindrical battery can, wherein an anode formed of the anode active material, and a cathode formed of a cathode active material are stacked through a separator and wound into a spiral form, the spiral form being arranged in the battery can.

* * * * *